(12) United States Patent
Takahashi

(10) Patent No.: US 12,398,667 B2
(45) Date of Patent: Aug. 26, 2025

(54) GENERATOR

(71) Applicant: HONDA MOTOR CO., LTD., Tokyo (JP)

(72) Inventor: Chisako Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/695,184

(22) PCT Filed: Sep. 28, 2021

(86) PCT No.: PCT/JP2021/035620
§ 371 (c)(1),
(2) Date: Mar. 25, 2024

(87) PCT Pub. No.: WO2023/053196
PCT Pub. Date: Apr. 6, 2023

(65) Prior Publication Data
US 2024/0418120 A1   Dec. 19, 2024

(51) Int. Cl.
| | |
|---|---|
| F02B 77/00 | (2006.01) |
| F02B 63/04 | (2006.01) |
| H02K 7/18 | (2006.01) |
| H02K 9/04 | (2006.01) |
| H02K 11/33 | (2016.01) |

(52) U.S. Cl.
CPC ............. *F02B 63/04* (2013.01); *F02B 77/00* (2013.01); *H02K 7/18* (2013.01); *H02K 9/04* (2013.01); *H02K 11/33* (2016.01)

(58) Field of Classification Search
CPC .......... F02B 63/04; F02B 77/00; F02B 63/00; F02B 63/044; H02K 9/04
See application file for complete search history.

(56) References Cited

U.S. PATENT DOCUMENTS

| | | | |
|---|---|---|---|
| 6,738,468 B1 | 5/2004 | Gilbert et al. | |
| 7,779,793 B2 * | 8/2010 | Ito ............................. | F01P 5/06 |
| | | | 123/41.63 |
| 10,122,245 B2 * | 11/2018 | Koyama .................. | F01P 1/06 |

(Continued)

FOREIGN PATENT DOCUMENTS

| | | |
|---|---|---|
| JP | 63-171632 U | 11/1988 |
| JP | 2001-027127 A | 1/2001 |

(Continued)

OTHER PUBLICATIONS

English translation of the International Preliminary Report on Patentability issued Mar. 28, 2024 in the corresponding International application No. PCT/JP2021/035620 (5 pages).

(Continued)

*Primary Examiner* — Pedro J Cuevas
(74) *Attorney, Agent, or Firm* — Rankin, Hill & Clark LLP

(57) ABSTRACT

In a generator including an engine, an inverter, and a cooling fan inside an exterior body, an air intake port is provided on a predetermined cover constituting a part of the exterior body. The air intake port aggregates each cooling air inlet of the generator, and the inverter is provided at a position where cooling air makes direct contact, the cooling air flowing in from the air intake port by the cooling fan, and the position corresponding to a position between the engine and the air intake port.

8 Claims, 7 Drawing Sheets

(56) References Cited

U.S. PATENT DOCUMENTS

| | | | | |
|---|---|---|---|---|
| 12,088,171 | B2* | 9/2024 | Yin | F02B 63/044 |
| 2008/0048509 | A1* | 2/2008 | Murakami | F02B 63/04 |
| | | | | 181/204 |
| 2008/0048510 | A1* | 2/2008 | Onodera | F01P 5/06 |
| | | | | 310/52 |
| 2008/0134997 | A1 | 6/2008 | Ito et al. | |
| 2010/0037837 | A1 | 2/2010 | Yamasaki et al. | |
| 2017/0271953 | A1* | 9/2017 | Koyama | F01P 1/06 |
| 2023/0097819 | A1* | 3/2023 | Kotani | H02K 7/1815 |
| | | | | 290/1 A |
| 2023/0353008 | A1* | 11/2023 | Yin | H02K 5/207 |

FOREIGN PATENT DOCUMENTS

| | | | |
|---|---|---|---|
| JP | 2003-120315 | A | 4/2003 |
| JP | 2008-051081 | A | 3/2008 |
| JP | 4082658 | B2 | 4/2008 |
| JP | 2010-106696 | A | 5/2010 |
| JP | 2014-173461 | A | 9/2014 |
| WO | 2008/032414 | A1 | 3/2008 |

OTHER PUBLICATIONS

International Search Report dated Dec. 21, 2021, Application No. PCT/JP2021/035620; 4 pages.
Written Opinion of the International Searching Authority dated Apr. 12, 2022; Application No. PCT/JP2021/035620; 6 pages.
International Preliminary Report on Patentability issued on Jul. 28, 2022; Application No. PCT/JP2021/035620; 8 pages.

* cited by examiner

1

GENERATOR

TECHNICAL FIELD

The present invention relates to a generator.

BACKGROUND

A generator is known, the generator including an engine, an inverter, and a cooling fan inside an exterior body (for example, refer to Patent Literature 1). In the generator described in Patent Literature 1, air intake ports (also called air supply ports) are included at a plurality of locations, the air intake ports for taking in cooling air from outside, and a controller is arranged on an inner side of a side cover, the controller corresponding to an inverter.

CITATION LIST

Patent Literature

Patent Literature 1: Japanese Patent No. 4082658

SUMMARY OF INVENTION

Technical Problem

Incidentally, there is a concern that a plurality of air intake ports is a cause of sound leakage, and a plurality of air intake ports is a cause of having moisture, such as rainwater, infiltrating. When performing noise countermeasures or water damage countermeasures in a plurality of locations, such countermeasures are a cause of a cost increase, or are a cause of a complication of the structure. Moreover, there is a concern that an air intake amount from one air intake port becomes relatively small due to having a plurality of air intake ports, and such an air intake amount is a disadvantage in the cooling of an inverter.

The present invention takes into consideration the above stated circumstances, and has an objective of making it easy to cool an inverter and making it easy to take countermeasures for noise or the like.

Solution to Problem

In a generator including an engine, an inverter, and a cooling fan inside an exterior body, an air intake port is provided on a predetermined cover constituting a part of the exterior body, the air intake port aggregating each cooling air inlet of the generator, and the inverter is provided at a position where cooling air makes direct contact, the cooling air flowing in from the air intake port by the cooling fan, and the position corresponding to a position between the engine and the air intake port.

Advantageous Effects of Invention

It becomes easy to cool an inverter, and it becomes easy to take countermeasures for noise or the like.

DESCRIPTION OF EMBODIMENTS

Figure 1:
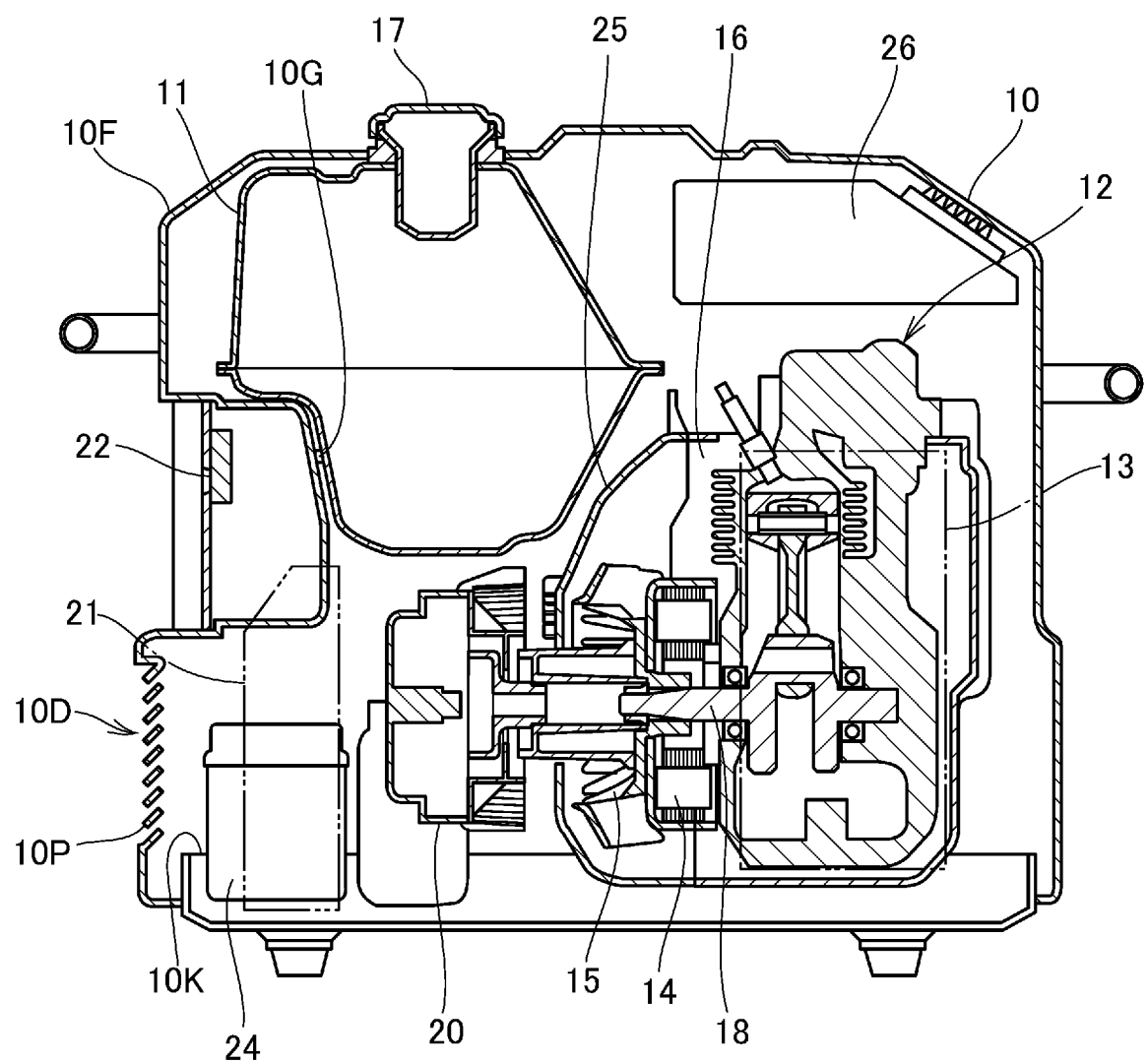
FIG. 1 is a configuration diagram of a generator according to an embodiment of the present invention.

FIG. 1 is a configuration diagram of a generator 1.

The generator 1 includes an exterior body 10. A fuel tank 11, an engine 12, a muffler 13, an alternator 14, a fan 15, and a shroud 16 are arranged on an inner side of the exterior body 10.

The fuel tank 11 includes an oil supply port capable of being accessed from outside, and fuel can be input to within the fuel tank 11 from this oil supply port. An oil supply cap 17 is freely attachably and detachably attached to the oil supply port.

The engine 12 is an ignition air cooling engine that is driven by the fuel within the fuel tank 11. The engine 12 includes a cylinder, a piston reciprocating within the cylinder, and a crank shaft 18 connected to the piston via a connecting rod.

A throttle valve and a fuel supply device are provided in an air intake pipe connected to the engine 12. Air and fuel are mixed, the air air-metered by the throttle valve and the fuel suppled from the fuel supply device, and an air-fuel mixture is supplied to the engine 12. The engine 12 burns the air-fuel mixture in a combustion chamber, drives the piston, and rotates the crank shaft 18 via the connecting rod.

The muffler 13 is connected to an outlet of an exhaust pipe connected to the engine 12. The muffler 13 performs a reduction of an exhaust pressure or the like.

The fuel driving the engine 12 may be gasoline, or may be a fuel other than gasoline. The fuel supply device may have a configuration that uses an injector, or may have a configuration that uses a carburetor.

The generator 1 includes a control unit. This control unit has a processor such as a Central Processing Unit (CPU) and a memory such as a Read Only Memory (ROM). The control unit controls each part of the generator 1, by having the processor execute programs stored in the memory. The control unit, for example, functions as an Electronic Control Unit (ECU) for outputting control signals that control an output of the engine 12.

The alternator 14 is attached to the crank shaft 18 of the engine 12. The alternator 14 is a multipole alternator that generates an alternating current, the multipole alternator driven by the engine 12. The alternator 14 has a rotor integrally rotating with the crank shaft 18 and a stator concentrically arranged with the rotor, the stator being opposite to a peripheral surface of the rotor.

A permanent magnet is provided on the rotor. Windings of a U-phase, a V-phase, and a W-phase are provided on the stator, the windings arranged, for example, at phase angles every 120 degrees.

The fan 15 is also called a cooling fan, and is attached to the crank shaft 18. A starting device 20 is arranged on the crank shaft 18, the starting device 20 for starting the engine 12. When the engine 12 is driven, power is generated by the alternator 14. When the engine 12 is driven, the fan 15 rotates, and cooling air is blown to the engine 12. The alternator 14 generates an alternating current.

The shroud 16 includes an opening to take in air, the opening being for ventilation. The shroud 16 guides blown air by the fan 15 to the surroundings of the engine 12.

The exterior body 10 includes an air intake port 10K for taking in outside air, and an exhaust port for exhausting air after the air cools the engine 12.

The generator 1 includes an inverter 21. The inverter 21 controls a voltage and a frequency of an alternating current generated by the alternator 14, and stabilizes an output.

Moreover, the generator 1 includes a control panel 22. A power receptacle, an operation switch or the like are provided on the control panel 22.

An alternating current from the inverter 21 is supplied to the power receptacle. A plug of a device that uses generated power is connected to the power receptacle. Note that a direct current may be supplied to the power receptacle.

Figure 2:
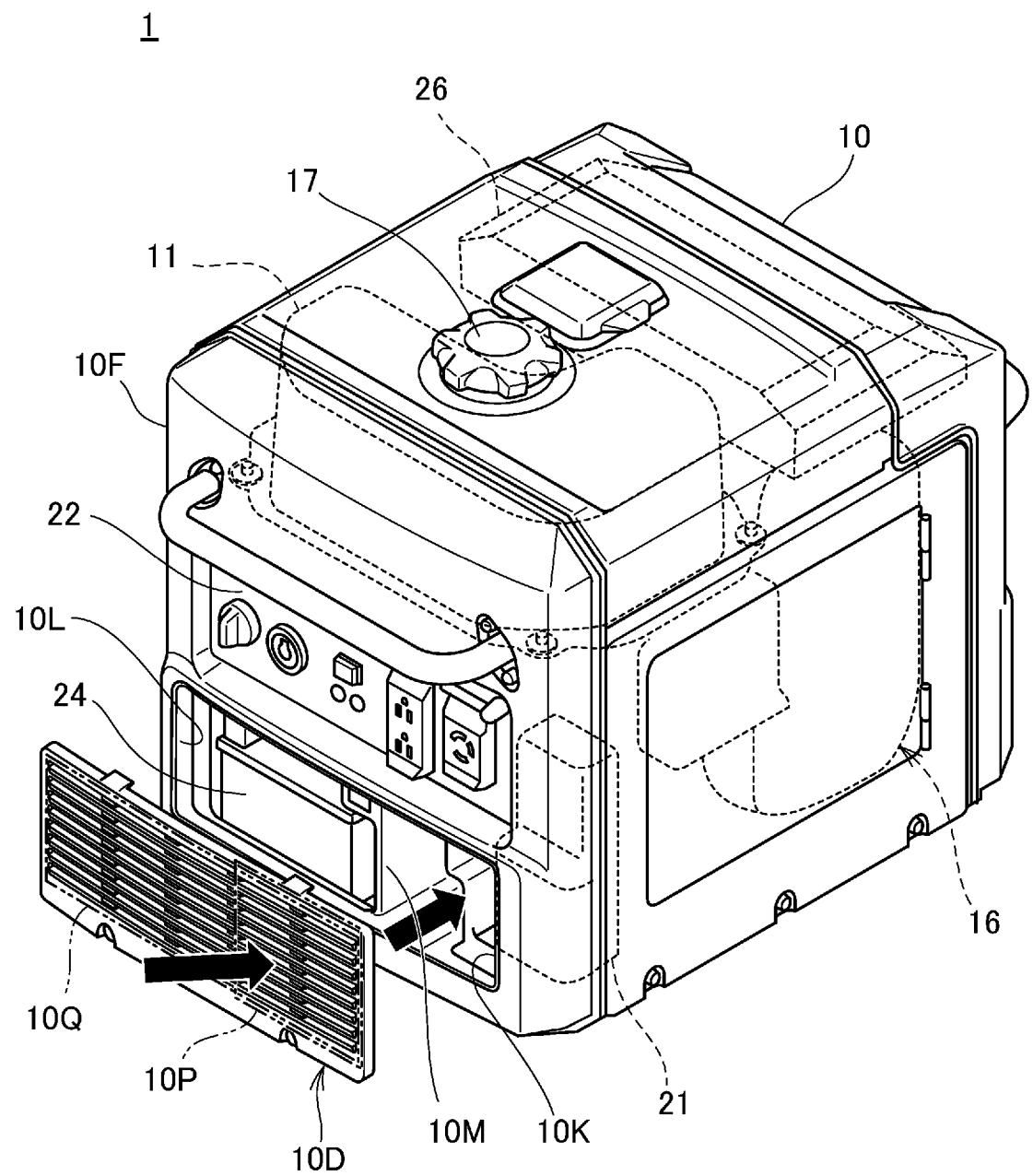
FIG. 2 is a perspective view of the generator.

FIG. 2 is a perspective view of the generator 1.

As shown in FIG. 1 and FIG. 2, the exterior body 10 includes an attachable and detachable front cover 10F. The front cover 10F is a cover for covering a front surface of the generator 1, and is also a cover that exposes the control panel 22 to the outside. Note that each direction in the present description is each direction at the time when the front cover 10F of the generator 1 is set as the front, as long as each direction is not particularly described. The front cover 10F corresponds to a "predetermined cover constituting a part of the exterior body 10" of the present invention.

The air intake port 10K that takes in outside air is provided on a lower part of the front cover 10F. The air intake port 10K is formed in an opening part on a lower part of the front cover 10F, the opening part opened toward the front of the generator 1, and is covered to freely take in air by a lid member 10D including a louver. Outside air rectified by the louver is taken in from the air intake port 10K as cooling air.

As shown in FIG. 2, the air intake port 10K is formed on a lower part and a right-side region of the front cover 10F. Moreover, another opening part 10L is formed on the front cover 10F, the another opening part 10L being at a position on a side of the air intake port 10K, the position corresponding to a lower part and a left region of the front cover 10F, and the another opening part 10L opened toward the front. A bridging member 10M is integrally provided with the front cover 10F between the air intake port 10K and the another opening part 10L, the bridging member 10M extending in an up-down direction. The bridging member 10M constitutes a boundary or a contour of the air intake port 10K. The bridging member 10M corresponds to a "boundary configuration part" of the present invention.

The inverter 21 is arranged on an inner side of the air intake port 10K. A battery 24 is arranged on a side of the inverter 21 and on an inner side of the another opening part 10L, the battery 24 supplying operation power to the starting device 20 or the like. The another opening part 10L is formed to be an opening from which the battery 24 is freely extracted.

The lid member 10D has a first louver part 10P for covering the air intake port 10K from the front, and a second louver part 100 for covering the another opening part 10L from the front. It becomes difficult to visually confirm an inner portion and it becomes difficult for rainwater to infiltrate the inner portion, by each of the louver parts 10P and 100, and ventilation and rectification are possible.

As shown in FIG. 1, the fan 15 is covered by a fan cover 25. The fan cover 25 is formed such that an end part on the front cover 10F side is opened, and the fan cover 25 is formed in a shape that expands in diameter toward the engine 12 side. Cooling air flowing into the fan cover 25 from the air intake port 10K by the fan 15 flows into the shroud 16 enclosing the surroundings of the engine 12.

The fan 15 is formed by a cooling fan that integrally rotates with a rotor of the alternator 14, in other words, the fan 15 is a cooling fan that integrally rotates with a rotary electrical device. Note that the configuration of the fan 15 and the configuration of the rotary electrical device may be appropriately changed.

The shroud 16 is a cooling air path sectioning body for sectioning a cooling air path in which cooling air flows in the surroundings of the engine 12, and the shroud 16 functions as a noise reduction member for reducing noise transmitted from the engine 12 to the outside, and as a thermal effect reduction member for reducing a thermal effect from the engine 12 to surrounding members, and the like. While the fan cover 25 and the shroud 16 are, for example, made of a resin material, the fan cover 25 and the shroud 16 may not be limited to be made of a resin material.

The cooling air that cools the engine 12 passes through the surroundings of the muffler 13, and is exhausted to the outside via a silencing chamber 26. The silencing chamber 26 is provided above the engine 12 and the muffler 13.

Figure 3:
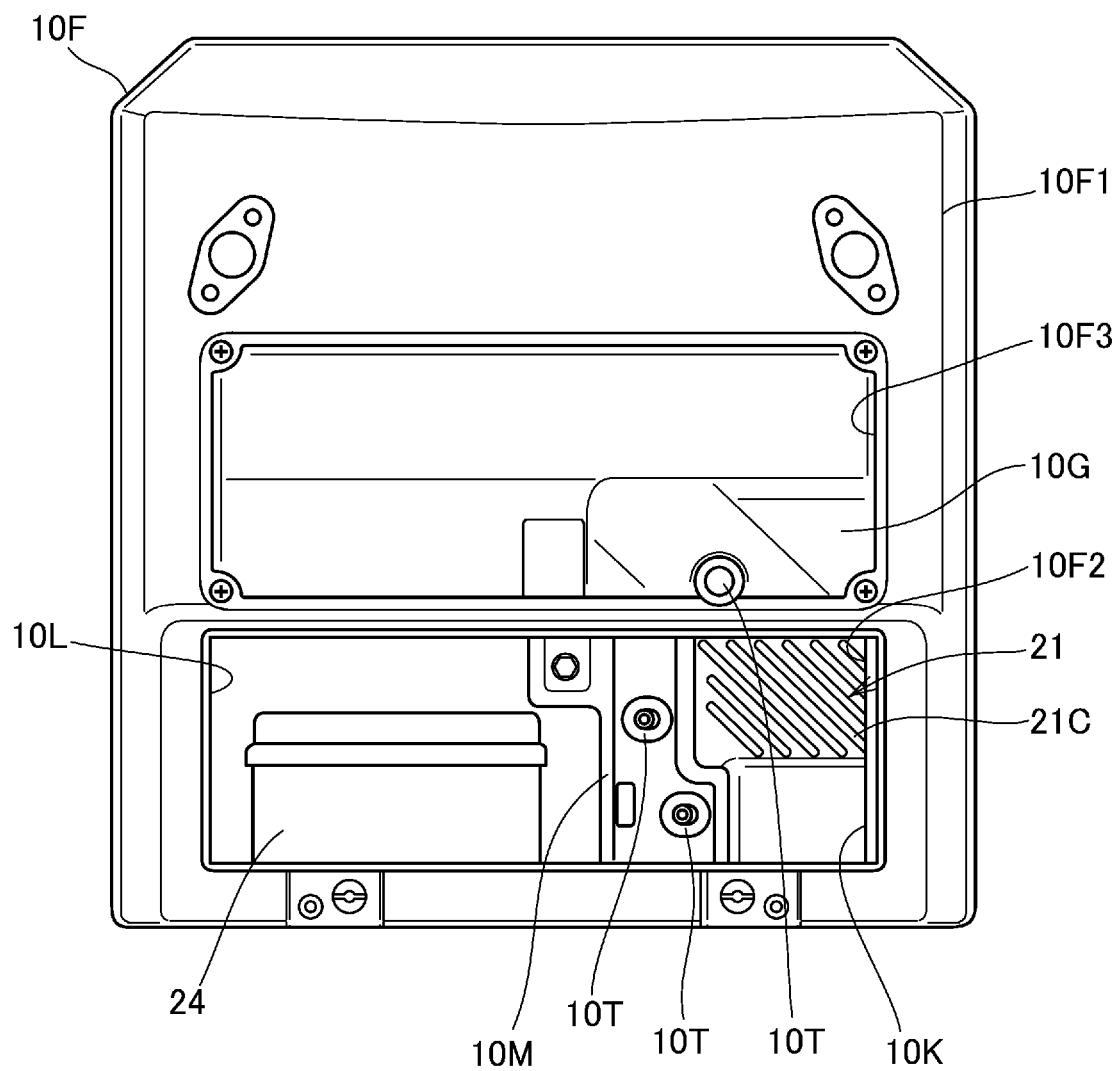
FIG. 3 is a figure in which a front cover is seen from a front surface along with peripheral components.

FIG. 3 is a figure in which the front cover 10F is seen from a front surface along with peripheral components.

The front cover 10F includes a plate-shaped cover body 10F1 constituting a front surface exposed in an external appearance, and a first opening part 10F2 and a second opening part 10F3 are formed on the cover body 10F1, the first opening part 10F2 opened in front at a front surface lower part and the second opening part 10F3 opened in front at a front surface upper part.

A right-side region of the first opening part 10F2 is allocated to the air intake port 10K. The air intake port 10K is a single air intake port aggregating cooling air inlets of the generator 1, and the air intake port 10K is set with a sufficient opening area.

A left-side region of the first opening part 10F2 is allocated to the another opening part 10L. The another opening part 10L is an opening from which the battery 24 is freely extracted. The bridging member 10M is provided on the front cover 10F, the bridging member 10M for bridging between the another opening part 10L and the air intake port 10K in an up-down extending direction.

Fastening parts 10T are provided spaced at intervals in an up-down direction on the bridging member 10M, the fastening parts 10T for inserting fastening members fastened to the inverter 21. The inverter 21 is fixed to a back surface of the bridging member 10M, by inserting one fastening member into each of the fastening parts 10T and fastening each of the fastening members to the inverter 21.

The fastening parts 10T are each provided at an upper position of the bridging member 10M on the front cover 10F, the fastening parts 10T for inserting fastening members fastened to the inverter 21. Note that the position and the number of the fastening parts 10T may be appropriately changed.

Figure 4:
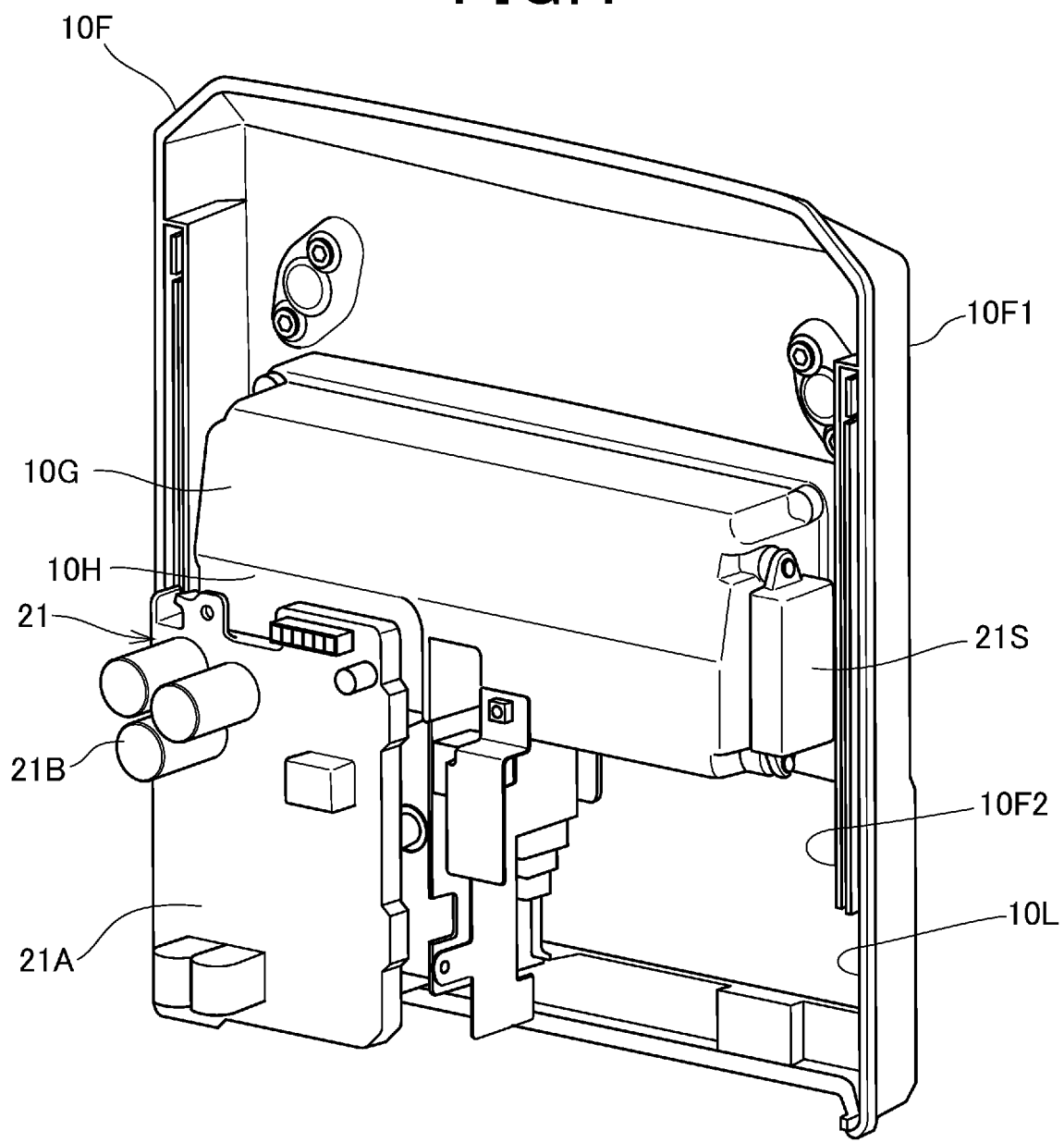
FIG. 4 is a figure in which the front cover is seen from a back side along with peripheral components.

FIG. 4 is a figure in which the front cover 10F is seen from a back side along with peripheral components. As shown in FIG. 4, the inverter 21 is arranged in a posture in which a length of an up-down direction is longest, namely, the inverter 21 is arranged in a vertical placement posture. By arranging the inverter 21 with a vertical placement, a necessary space can be reduced in a width direction while arranging the inverter 21 so as to cover the air intake port 10K from a back surface side. In this way, the inverter 21 can be arranged on a back surface side of the another opening part 10L, and it becomes easy to secure a necessary space for arrangement or extraction of the battery 24.

The inverter 21 is arranged with a space between the inverter 21 and the front cover 10F, the space opened in a front-rear direction. In this way, cooling air from the air intake port 10K makes direct contact with a front surface of the inverter 21, and afterwards the cooling air easily flows in the surroundings of the inverter 21. The inverter 21 of the present configuration includes a rectangular parallelepiped substrate 21A and electrical components 21B mounted on the substrate 21A. A heat sink 21C (FIG. 3) is included on a front surface corresponding to the front cover 10F side. Accordingly, the inverter 21 can be effectively cooled by the cooling air from the air intake port 10K. Note that the configuration of the inverter 21 may be appropriately changed.

The second opening part 10F3 functions as a window that exposes the control panel 22 to the outside. As shown in FIG. 1, a control panel case 10G (hereinafter, written as the "panel case 10G") is attached to the front cover 10F, the panel case 10G having the control panel 22 attached and covering the control panel 22 from a back surface side.

As shown in FIG. 4, the panel case 10G is formed in an expanding shape that expands backward from the cover body 10F1. A part of the panel case 10G is formed on an eaves part 10H for covering above the inverter 21, by having the panel case 10G formed in a shape in which a portion corresponding to the inverter 21 is recessed to the cover body 10F1 side (front side). The inverter 21 being water damaged due to rainwater from above is restrained, by this eaves part 10H.

As shown in FIG. 4, a sensor 21S is attached to a side surface of the panel case 10G, the sensor 21S being a CO sensor or the like. In this way, a plurality of electrical components are attached to the front cover, the plurality of electrical components including the inverter 21, the control panel 22, and the sensor 21S. In this way, the plurality of electrical components 21, 22, and 23 can be modularized as one module, and exchange work or the like becomes easy.

Figure 5:
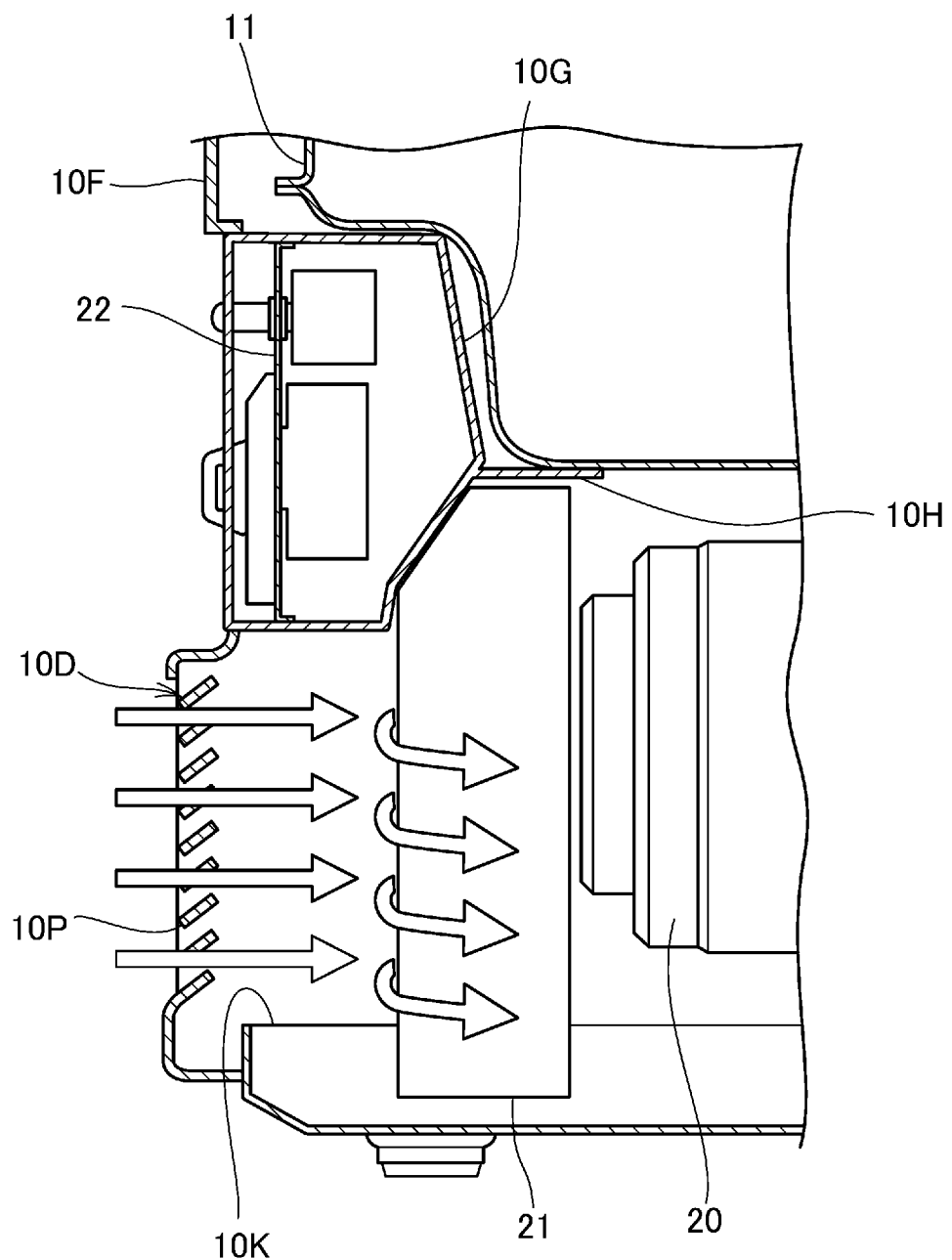
FIG. 5 is a side cross-sectional view showing an air intake port along with peripheral components.

FIG. 5 is a side cross-section view showing the air intake port 10K along with peripheral components. The flow of cooling air is shown by arrows in FIG. 5.

As shown in FIG. 5, cooling air consisting of outside air flows into the air intake port 10K, by rotation of the fan 15. In the present configuration, since cooling air inlets of the generator 1 are aggregated into the single air intake port 10K, there can be a lot of cooling air from the air intake port 10K, compared to a case of providing a plurality of air intake ports. Since this cooling air makes direct contact with the inverter 21, this cooling air can effectively cool the inverter 21.

As shown in FIG. 5, since above the inverter 21 is covered by the eaves part 10H of the panel case 10G, it becomes easy to avoid water damage to the inverter 21 from above. Moreover, since an upper part of the inverter 21 is in close proximity to the panel case 10G, a flow of cooling air to above the inverter 21 can be restrained. In the present configuration, since gaps are formed on the left and the right of the inverter 21, it becomes easy for cooling air to flow to the left and the right of the inverter 21.

Figure 6:
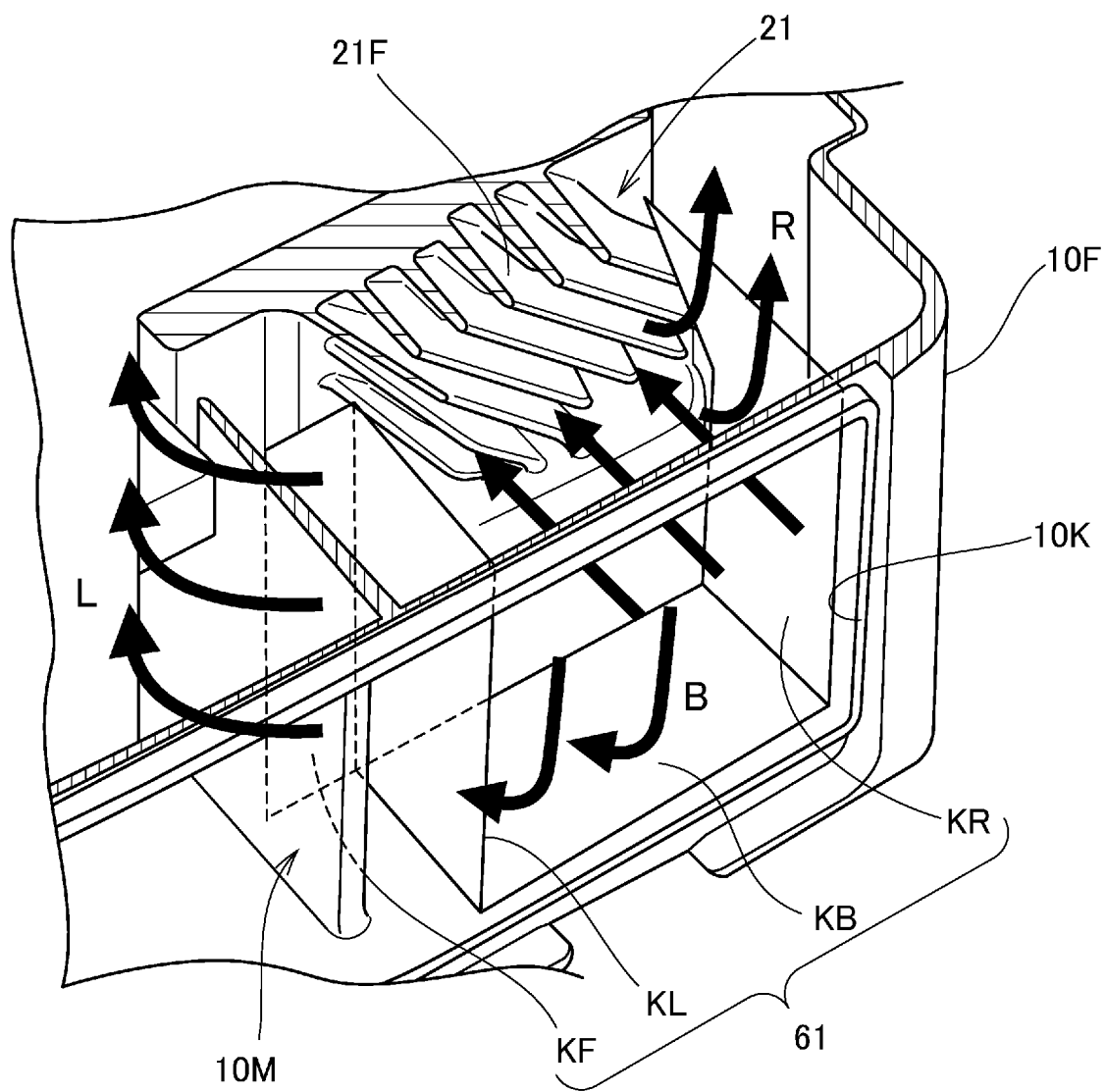
FIG. 6 is a figure showing a flow of cooling air in the periphery of the air intake port.
Figure 7:
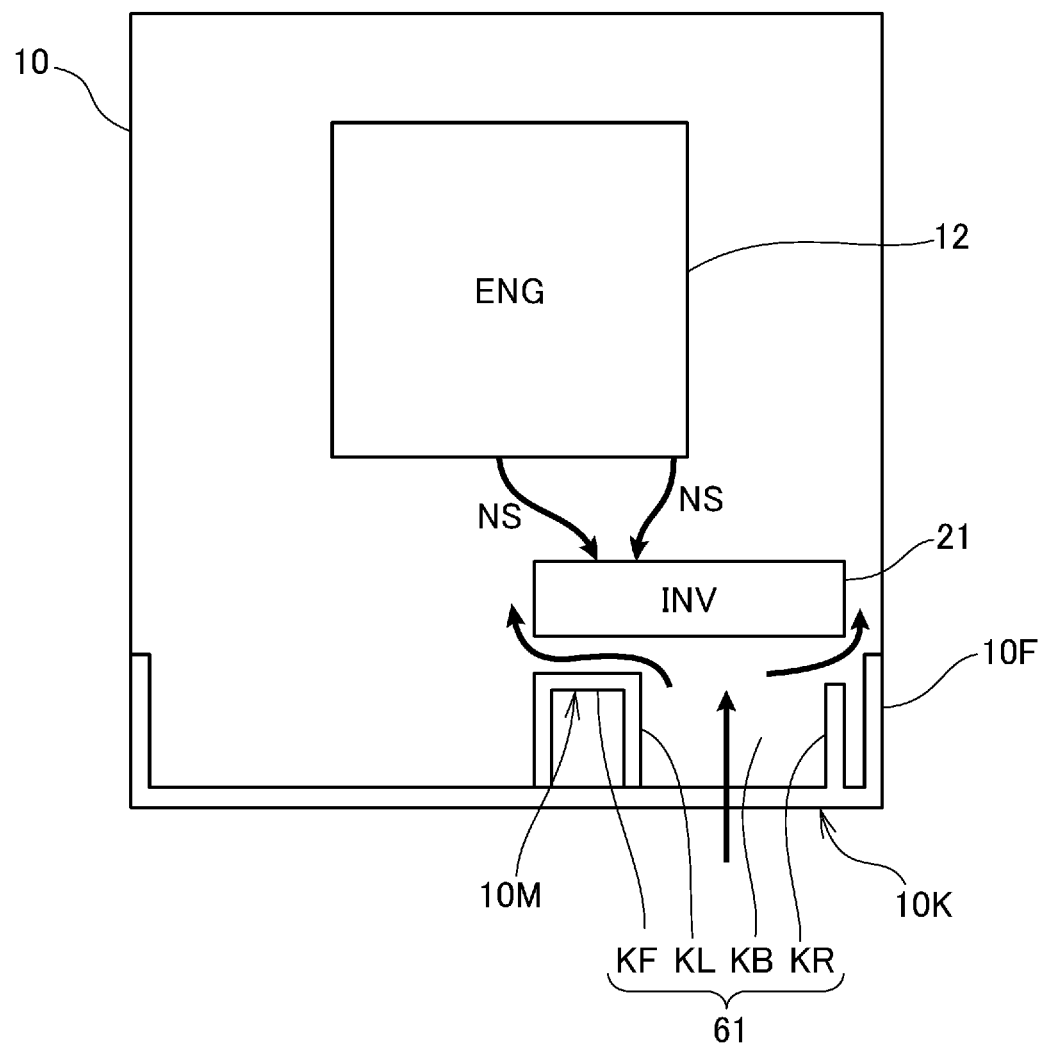
FIG. 7 is a figure schematically showing a structure in the periphery of the air intake port.

FIG. 6 is a figure showing a flow of cooling air in the periphery of the air intake port 10K. FIG. 7 is a figure schematically showing a structure in the periphery of the air intake port 10K.

As shown in FIG. 6 and FIG. 7, there are left and right side walls KL and KR connected to the air intake port 10K on the front cover 10F, and there is a bottom plate KB connected to the air intake port 10K on the front cover 10F. The left and right side walls KL and KR and the bottom plate KB extend in a front-rear direction of the generator 1, and guide the cooling air from the air intake port 10K to the inverter 21 and the surroundings of the inverter 21.

More specifically, as shown in FIG. 7, the right-side side wall KR is arranged with a gap between the right-side side wall KR and the inverter 21, the gap opened in a front-rear direction. Accordingly, after a part of the cooling air is guided from the air intake port 10K toward the inverter 21, the part of the cooling air can be flown from a front surface of the inverter 21 to the right side ("R" side in FIG. 6).

Since the left-side side wall KL and the bottom plate KB extend in a front-rear direction, the cooling air from the air intake port 10K is guided toward a front surface of the inverter 21 without being obstructed, and the cooling air is effectively applied to a front surface of the inverter 21. A part of the cooling air passes through a gap between the bottom plate KB and the inverter 21, and also flows to a lower side ("B" side in FIG. 6) of the inverter 21.

The left-side side wall KL constitutes a part of the bridging member 10M. As shown in FIG. 7, a gap is formed between the wall part KF of the bridging member 10M and the inverter 21, the gap opened to a left-side space of the inverter 21.

Therefore, a part of the cooling air flowing in from the air intake port 10K flows into the gap between the wall part KF of the bridging member 10M and the inverter 21, and flows to a left side ("L" side in FIG. 6) of the inverter 21 along a front surface of the inverter 21. Note that since the wall part KF is a wall connected with the side wall KL that sections a left end of the air intake port 10K, it becomes easy to smoothly guide cooling air flowing along the left side wall KL to a gap opened on a rear side of the wall part KF.

In this way, the cooling air from the air intake port 10K is distributed to each of the front surface of the inverter 21, the left and the right of the inverter 21, and below the inverter 21.

Namely, the left and right side walls KL and KR, the bottom plate KB, and the wall part KF of the bridging member 10M each function as an air guiding part 61 (FIG. 7) for guiding cooling air to the surroundings of the inverter 21, the left and right side walls KL and KR, the bottom plate KB, and the wall part KF provided on the front cover 10F.

By these air guiding parts 61, it becomes easy to implement a flow of cooling air suitable for cooling of the inverter 21 or the like. Moreover, since each of these air guiding parts 61 is integrally provided on the front cover 10F, an increase in the number of components is avoided. Note that the shape of any one of the air guiding parts 61 may be changed, or any one of the air guiding parts 61 may be provided separately from the front cover 10F.

Moreover, as shown in FIG. 7, the inverter 21 is arranged at a position corresponding to a position between the engine 12 and the air intake port 10K. In this way, it becomes easy for the inverter 21 to function as a noise shielding wall between the engine and the air intake port 10K, and a sound propagation path (corresponding to an air propagation path) connecting the engine 12 and the air intake port 10K becomes a labyrinth shape. Therefore, a situation can be avoided in which various types of sounds NS emitted from the engine 12 or the like are directly emitted from the air intake port 10K, and sound leaking from the generator 1 to the outside can be reduced.

Moreover, since the lid member 10D is provided, the lid member 10D for covering the air intake port 10K by a louver, it becomes difficult for dust or moisture to enter into the air intake port 10K, and it becomes easier to reduce sound leaking to the outside, while securing an air intake area.

As described above, the generator 1 of the present embodiment provides the air intake port 10K on the front cover 10F constituting a part of the exterior body 10, the air intake port 10K aggregating cooling air inlets of the generator 1, and the inverter 21 is provided at a position where cooling air makes direct contact, the cooling air flowing in from the air intake port 10K by the fan 15, and the position corresponding to a position between the engine 12 and the air intake port 10K. According to this configuration, it becomes easy to cool the inverter 21, and it becomes easy to take countermeasures for noise or the like, by a concentrated air intake from one location and the arrangement of the inverter 21.

Moreover, the front cover 10F has the air guiding parts 61 for guiding the cooling air of the air intake port 10K to the surroundings of the inverter 21, and has the bridging member 10M that becomes a boundary configuration part constituting a boundary of the air intake port 10K. Also, the bridging member 10M serves both as the fastening parts 10T for fastening the inverter 21, and at least a part of the air guiding parts 61. According to this configuration, the function of the fastening parts 10T and the function of the air guiding parts 61 of the bridging member 10M are aggregated in the front cover 10F, and it becomes easy to attempt miniaturization and cooling performance improvement.

Moreover, the panel case 10G is included on a back side of the front cover 10F, the panel case 10G for covering at least a part of the control panel 22, and the eaves part 10H is provided on the panel case 10G, the eaves part 10H for covering above the inverter 21. According to this configuration, it becomes easy to avoid water damage to the inverter 21 from above by using the panel case 10G. Moreover, a flow of cooling air to above the inverter 21 is restrained by the eaves part 10H, and it becomes easy to distribute cooling air to the left and the right of the inverter 21 or the like.

Moreover, the another opening part 10L is provided on a region in the front cover 10F, the region excluding the air intake port 10K, and the battery 24 is arranged within the exterior body 10, the battery 24 freely extracted through the another opening part 10L and the battery 24 being an exchange target or a maintenance target. According to this configuration, the functions of a takeout port of the battery 24 can be also aggregated in the front cover 10F, and maintenance such as battery exchange becomes easy.

Moreover, since the inverter 21 is arranged in a vertical placement posture in which a length of an up-down direction is longest, a space of the battery 24 is secured on the side of the inverter 21, and it becomes easy for cooling air to flow on the side of the inverter 21. Moreover, it becomes easy to cool the battery 24, by the cooling air flowing on the side of the inverter 21.

Moreover, since the lid member 10D is freely attachably and detachably provided on the front cover 10F, the lid member 10D for covering the air intake port 10K and the another opening part 10L by a louver, it becomes difficult for dust or moisture to enter, and it becomes easier to reduce sound leaking to the outside, while securing an air intake area.

The above embodiment is just one embodiment of the present invention, and the above embodiment can be arbitrarily modified and applied in a range that does not deviate from the content of the present invention. For example, while a case is described in which the air intake port 10K or the like is provided on the front cover 10F, the present invention is not limited to this, and another cover constituting a part of the exterior body 10 may be provided, and the air intake port 10K or the like may be provided on the another cover. Moreover, while a case is described in which the battery 24 is arranged to be freely extracted from the another opening part 10L, the present invention is not limited to this, and another component may be arranged to be freely extracted through the another opening part 10L, the another component being an exchange target or a maintenance target.

Moreover, while a case is described in which the inverter 21 is arranged with a vertical placement, in the case where the inverter 21 has a small size, or in the case where the exterior body 10 of the generator 1 has a large size, the inverter 21 may be arranged with a posture other than a vertical placement. Moreover, while a case is described in which the present invention is applied to the generator 1 shown in FIG. 1 or the like, the present invention is not limited to this, and the present invention may be applied to various types of generators that are widely distributed. For example, the present invention may be applied to a generator that includes an inner-rotor alternator, or the present invention may be applied to a generator having a rotary electrical device other than an alternator.

(Configurations supported by the embodiment) The above-stated embodiment supports the following configurations.

(Configuration 1) In a generator including an engine, an inverter, and a cooling fan inside an exterior body, an air intake port is provided on a predetermined cover constituting a part of the exterior body, the air intake port aggregating each cooling air inlet of the generator, and the inverter is provided at a position where cooling air makes direct contact, the cooling air flowing in from the air intake port by the cooling fan, and the position corresponding to a position between the engine and the air intake port.

According to this configuration, it becomes easy to cool the inverter, and it becomes easy to take countermeasures for noise or the like.

(Configuration 2) The generator described in Configuration 1, in which the predetermined cover has an air guiding part for guiding the cooling air of the air intake port to a surrounding of the inverter, and has a boundary configuration part constituting a boundary of the air intake port, and the boundary configuration part serves both as a fastening part for fastening the inverter, and at least a part of the air guiding part.

According to this configuration, the function of the fastening part and the function of the air guiding part are aggregated in the predetermined cover, and it becomes easy to attempt miniaturization and cooling performance improvement.

(Configuration 3) The generator described in Configuration 1 or 2, including a control panel case on a back side of the predetermined cover, the control panel case for covering at least a part of a control panel, and an eaves part is provided on the control panel case, the eaves part for covering above the inverter.

According to this configuration, it becomes easy to avoid water damage on the inverter from above by using the control panel case.

(Configuration 4) The generator described in any one of Configurations 1 to 3, in which another opening part is provided on a region in the predetermined cover, the region excluding the air intake port, and a predetermined component is arranged within the exterior body, the predetermined component freely extracted through the another opening part, and the predetermined component being an exchange target or a maintenance target.

According to this configuration, the functions of a takeout port of a component can be also aggregated in the predetermined cover, the component being an exchange target or a maintenance target.

(Configuration 5) The generator described in Configuration 4, in which the inverter is arranged in a vertical placement posture in which a length of an up-down direction is longest.

According to this configuration, spaces for another component is secured on the side of the inverter, and the cooling air easily flows on the side of the inverter. Moreover, it becomes easy to cool the another component by the cooling air.

(Configuration 6) The generator described in Configuration 4 or 5, in which the predetermined component is a battery.

According to this configuration, the functions of a takeout port of the battery can be also aggregated in the predetermined cover, and maintenance such as battery exchange becomes easy.

(Configuration 7) The generator described in any one of Configurations 4 to 6, in which a lid member is freely attachably and detachably provided on the predetermined cover, the lid member for covering the air intake port and the another opening part by a louver.

According to this configuration, it becomes difficult for dust or moisture to enter, and it becomes easier to reduce sound leaking to the outside, while securing an air intake area.

REFERENCE SIGNS LIST 1 generator
10 exterior body
10D lid member
10F front cover (predetermined cover)
10K air intake port
10L another opening part
10M bridging member
10G control panel case
10H eaves part
11 fuel tank
12 engine
13 muffler
14 alternator (rotary electrical device)
15 fan (cooling fan)
16 shroud
18 crank shaft
20 starting device
21 inverter
22 control panel
24 battery
25 fan cover
26 silencing chamber
61 air guiding part
KL, KR side wall (air guiding part)
KB bottom plate (air guiding part)
KF wall part of bridging member (air guiding part)

The invention claimed is:

1. A generator comprising an engine, an inverter, and a cooling fan inside an exterior body, wherein
a cooling air inlet of the generator is an air intake port,
the air intake port is provided on a predetermined cover constituting a part of the exterior body,
the inverter is provided at a position where cooling air makes direct contact, the cooling air flowing in from the air intake port by the cooling fan, and the position corresponding to a position between the engine and the air intake port,
the air intake port is provided with:
an eaves part that contacts the inverter and that covers above the inverter; and
a bridging member that is extending in an up-down direction and toward the inverter, wherein
an air guiding part is provided between the bridging member and the inverter, and
the air guiding part is in a labyrinth shape.

2. The generator according to claim 1, wherein
the air guiding part is provided on the predetermined cover
the air guiding part guides the cooling air of the air intake port to a surrounding of the inverter, and has a boundary configuration part constituting a boundary of the air intake port, and
the boundary configuration part serves both as a fastening part for fastening the inverter and at least a part of the air guiding part.

3. The generator according to claim 1, comprising:
a control panel case on a back side of the predetermined cover, the control panel case for covering at least a part of a control panel, wherein
the eaves part is provided on the control panel case.

4. The generator according to claim 1, wherein
another opening part is provided on a region in the predetermined cover, the region excluding the air intake port, and
a predetermined component is arranged within the exterior body, the predetermined component freely extracted through the another opening part, and the predetermined component being an exchange target or a maintenance target.

5. The generator according to claim 4, wherein
the inverter is arranged in a vertical placement posture in which a length of an up-down direction is longest.

6. The generator according to claim 4, wherein
the predetermined component is a battery.

7. The generator according to claim 4, wherein
a lid member is freely attachably and detachably provided on the predetermined cover, the lid member for covering the air intake port and the another opening part by a louver.

8. The generator according claim 1, wherein
the predetermined cover is a front cover for covering a front surface of the exterior body,
a control panel is arranged on a back side of the front cover, the control panel being higher than the air intake port,
a control panel case is arranged on a back side of the front cover, the control panel case for covering the control panel from a back surface side, and
a part of the control panel case is formed in a recessed shape toward the front cover side, and by having an upper part of the inverter positioned on a region with the recessed shape, the upper part of the inverter is arranged at a position in a horizontal direction of the generator, the position overlapping with a part of the control panel, and the part of the control panel case becomes the eaves part.

* * * * *